United States Patent
Kim (10) Patent No.: US 10,358,124 B2
(45) Date of Patent: Jul. 23, 2019

(54) DRIVING FORCE CONTROL METHOD DURING ENGINE CLUTCH SLIPPING OF TMED HEV

(71) Applicant: Hyundai Motor Company, Seoul (KR)

(72) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 794 days.

(21) Appl. No.: 14/960,538

(22) Filed: Dec. 7, 2015

(65) Prior Publication Data

US 2016/0375889 A1    Dec. 29, 2016

(30) Foreign Application Priority Data

Jun. 25, 2015 (KR) .................. 10-2015-0090279

(51) Int. Cl.
*B60W 20/00* (2016.01)
*F16D 48/06* (2006.01)
(Continued)

(52) U.S. Cl.
CPC ............... *B60W 20/00* (2013.01); *B60K 6/26* (2013.01); *B60K 6/387* (2013.01); *B60K 6/442* (2013.01); *B60W 10/02* (2013.01); *B60W 10/06* (2013.01); *B60W 10/08* (2013.01); *F16D 48/06* (2013.01); *F16D 48/066* (2013.01); *B60K 2006/268* (2013.01); *B60Y 2200/92* (2013.01); *B60Y 2300/182* (2013.01); *B60Y 2300/426* (2013.01); *B60Y 2300/43* (2013.01); *B60Y 2400/42* (2013.01); *B60Y 2400/47* (2013.01); *F16D 2500/1026* (2013.01); *F16D 2500/1045* (2013.01); *F16D 2500/1066* (2013.01); *F16D 2500/10412* (2013.01);
(Continued)

(58) Field of Classification Search
CPC ..................................................... B60W 20/00
See application file for complete search history.

(56) References Cited

U.S. PATENT DOCUMENTS

2013/0274969 A1* 10/2013 Wang .................... B60W 10/08
701/22
2015/0134160 A1* 5/2015 Liang .................... B60W 10/06
701/22

FOREIGN PATENT DOCUMENTS

JP    2003-293801 A    10/2003
JP    3490420 B2       1/2004
(Continued)

*Primary Examiner* — Imran K Mustafa
(74) *Attorney, Agent, or Firm* — Mintz Levin Cohn Ferris Glovsky and Popeo, P.C.; Peter F. Corless (57) ABSTRACT

A driving force control method is provided for engine clutch slipping of a TMED HEV that includes an engine 10 and a second motor 50, a first motor 30 disposed at a transmission side, an engine clutch 20 interposed between the engine 10 and the first motor 30, and a multi-clutch transmission 35 connected with an output terminal of the first motor 30. The method includes verifying whether a control for maintaining a target speed of the engine is achieved by an engine feedback control or by a second motor torque feedback control and applying clutch pressure for the clutch slipping with hydraulic pressure. When the clutch pressure is applied clutch slipping transmission torque is estimated. Torque of the engine clutch is equivalent to the pressure as a load. Second motor dischargeable limit torque, second motor assist torque, and engine torque are calculated to then execute a slip control.

10 Claims, 5 Drawing Sheets

(51) Int. Cl.
- *B60K 6/387* (2007.10)
- *B60K 6/26* (2007.10)
- *B60K 6/442* (2007.10)
- *B60W 10/06* (2006.01)
- *B60W 10/08* (2006.01)
- *B60W 10/02* (2006.01)

(52) U.S. Cl.
CPC ............... *F16D 2500/1107* (2013.01); *F16D 2500/3067* (2013.01); *F16D 2500/30421* (2013.01); *F16D 2500/50293* (2013.01); *F16D 2500/5122* (2013.01); *F16D 2500/70406* (2013.01); *F16D 2500/70426* (2013.01); *Y10S 903/914* (2013.01); *Y10S 903/93* (2013.01)

(56) References Cited

FOREIGN PATENT DOCUMENTS

| | | | |
|---|---|---|---|
| JP | 2005-325967 A | 11/2005 | |
| JP | 2013-241100 A | 12/2013 | |
| KR | 2011-0062120 A | 6/2011 | |
| KR | 10-1371482 B1 | 3/2014 | |
| KR | 10-2014-0134405 A | 11/2014 | |

\* cited by examiner

FIG. 1

RELATED ART

FIG. 2

RELATED ART

<NVH CHARACTERISTIC DEPENDING ON ENGINE OPERATING POINT>

FIG. 3

RELATED ART

<NVH CHARACTERISTIC DEPENDING ON ENGINE OPERATING POINT>

FIG. 8

DRIVING FORCE CONTROL METHOD DURING ENGINE CLUTCH SLIPPING OF TMED HEV

CROSS-REFERENCE TO RELATED APPLICATION

This application claims under 35 U.S.C. § 119(a) the benefit of Korean Patent Application No. 10-2015-0090279 filed on Jun. 25, 2015, the entire contents of which are incorporated herein by reference.

BACKGROUND (a) Technical Field

The present invention relates to a driving force control method during engine clutch slipping in a transmission mounted electric device (TMED) HEV in which a motor and a transmission are connected. More particularly, the present invention relates to an enhanced driving force control method in case of an engine clutch slipping in TMED hybrid electric vehicle (HEV), which allows a separator motor (HSG) to bear a load while performing a low-speed and large-torque operation in a zone where noise, vibration and harshness (NVH) is disadvantageous when a vehicle starts to improve engine operation to be maintained in a zone where the NVH is advantageous.

(b) Background Art

Due to the demand for improving fuel efficiency of a vehicle and the demand for saving fuel while meeting a discharge gas regulation of various countries, development of a hybrid electric vehicle (HEV) using both an engine and an electric motor as power has been developed. The hybrid electric vehicle is a type of vehicle that uses both the engine and the electric motor as driving force of the vehicle and as a result, the engine is driven when the vehicle is driven at a high speed and both the engine and the electric motor are driven when the driving force requires an increase, whereas the electric motor is driven when the vehicle is driven in the city (e.g., with high congestion).

The hybrid electric vehicle is driven by two power sources, the engine and the motor, and an engine clutch is disposed between the power sources and as a result, the hybrid electric vehicle operates in an electric vehicle (EV) mode or HEV mode based on a connection (coupling) of the engine clutch and during this process, optimal output torque may be provided by considering how the engine and the motor harmoniously operate.

Figure 1:
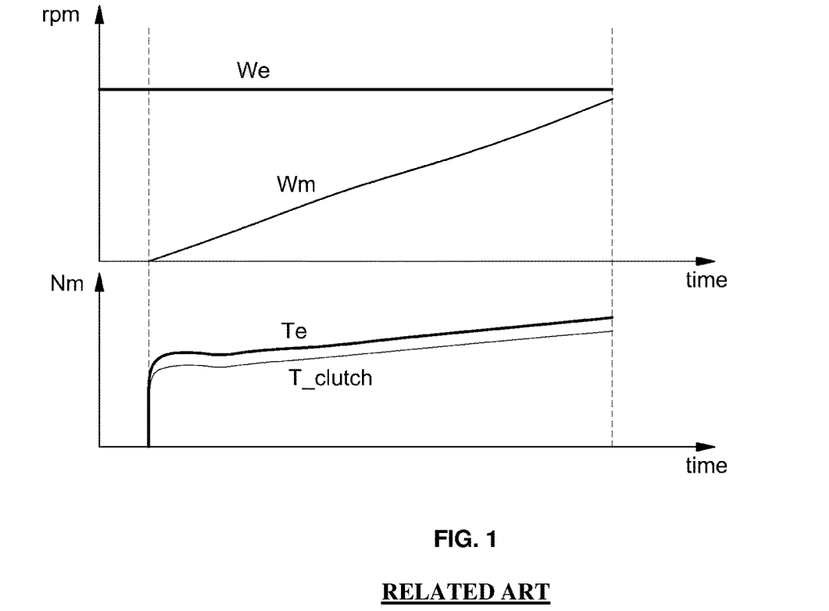
FIG. 1 is a graph illustrating an engine behavior when an engine clutch slip-starts according to the related art.
Figure 2:
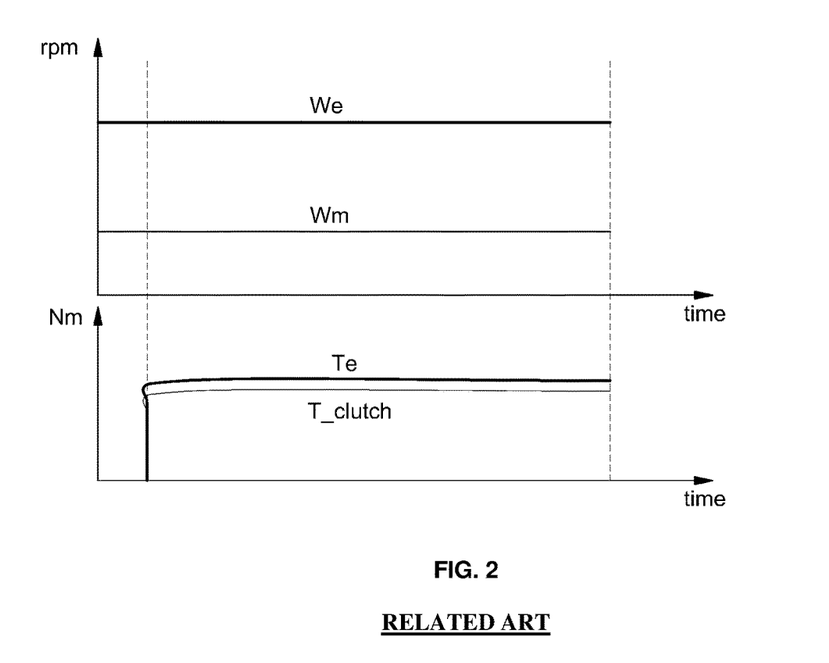
FIG. 2 is a graph illustrating the engine behavior at the time of controlling an engine clutch transmission torque feedback according to the related art.

The engine outputs clutch torque and additional torque for maintaining a speed when the engine clutch slips (see FIG. 1) and a control for the engine and the motor to maintain a predetermined speed is executed during learning engine clutch transmission torque, and as a result, the torque of the engine needs to be increased as much as the clutch torque when pressure is applied (see FIG. 2). In FIGS. 1 and 2, We represents an engine angular speed and Wm represents a motor angular speed. It can be seen that the engine is operated in a zone in which NVH is disadvantageous in a torque zone where engine torque Te is substantially large based on clutch slipping transmission torque T_clutch of a substantially large torque zone in both a behavior when the engine clutch slip-starts and a behavior when the engine clutch transmission torque is learned.

Figure 3:
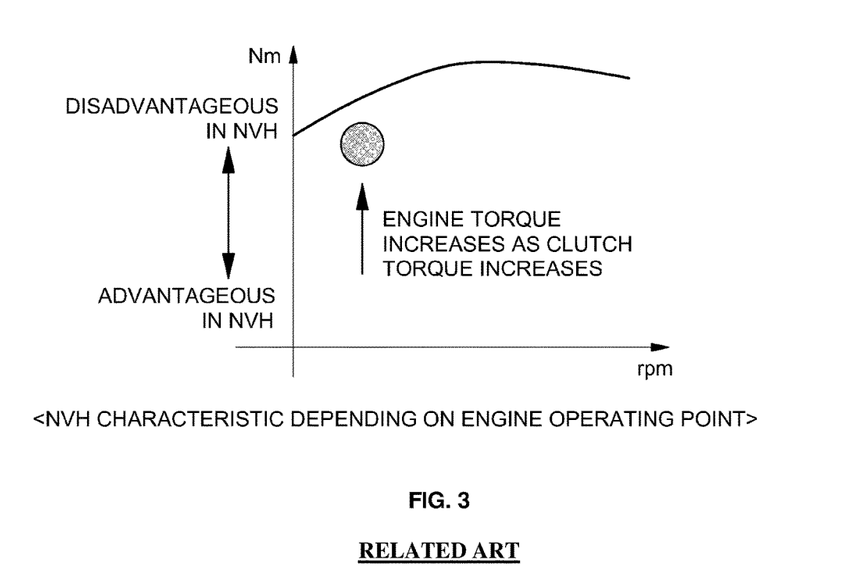
FIG. 3 is a graph illustrating an NVH characteristic change when clutch torque increases in an HEV according to the related art.

In general, an operation speed of the engine is adjusted to approximately an idle revolutions per minute (rpm) when the vehicle starts and the engine is required to output additional torque to maintain the clutch torque and the engine speed when the engine clutch slips. Since the engine bears an engine clutch torque load, the engine operates with a low speed and large torque as schematically illustrated in FIG. 3. As a result, the engine operates in an operation zone in which noise, vibration, and harshness (NVH) is disadvantageous.

In this regard, the present applicant has disclosed a system and a method for learning the transmission torque of the engine clutch of the hybrid electric vehicle, which maintain the engine at a predetermined speed (e.g., idle speed) and allow a start generator to appropriately bear the transmission torque of the engine clutch based on operation hydraulic pressure of the engine clutch to prevent engine booming in the low-speed and large-torque zone at the time of learning the transmission torque and enhance the NVH, while learning the transmission torque of the engine clutch of the hybrid electric vehicle.

Additionally, a shift control device of the related art includes a motor assist control part that generates assist torque equivalent to a deviation between required torque for an internal combustion engine and output torque of the internal combustion engine during shifting a driving device that includes a generator used to assist the internal combustion engine in a motor to correct assist torque using correction torque when clutch slipping occurs, in a HEV including the internal combustion engine and the motor.

Another developed related art teaches a hybrid electric vehicle having a motor and an engine selectively connected on a drive line by a controller configured to provide additional motor torque to compensate for engine inertia resistance based on a clutch slipping speed value during a period of clutch engagement and a clutch pressure value and the engine is connected to a starter used to start the engine when additional torque is required.

The above information disclosed in this section is merely for enhancement of understanding of the background of the invention and therefore it may contain information that does not form the prior art that is already known in this country to a person of ordinary skill in the art.

SUMMARY

The present invention provides a driving force control method during an engine clutch slipping in a TMED HEV that allows a hybrid starter generator (HSG) as a separate second motor connected to a general engine to bear an engine load increase amount when an engine slips to control an engine to be operated in a zone where NVH is less generated to remove a problem caused when NVH worsens during a low-speed operation of the TMED HEV in the related art.

In one aspect, the present invention provides a driving force control method during engine clutch slipping of a TMED HEV that may include: an engine 10 having a second motor 50 which is a hybrid starter generator (HSG), a first motor 30 disposed at a transmission side, an engine clutch 20 interposed between the engine 10 and the first motor 30, and a multi-clutch transmission 35 connected with an output terminal of the first motor 30. The method may include verifying whether a control for maintaining a target speed of the engine is achieved by a engine feedback control or by a second motor torque feedback control (S1); applying, by a hybrid control unit (HCU), clutch pressure for the clutch slipping with hydraulic pressure (S3 and S10); estimating, when the clutch pressure is applied in steps S3 and S10, clutch slipping transmission torque T_clutch in which torque of the engine clutch equivalent to the pressure acts as a load (S4 and S11); calculating second motor dischargeable limit torque T_hsgDch (S5 and S12); calculating second motor assist torque and engine torque (S6 and S13); and executing a slip control (S7 and S14).

In an exemplary embodiment, when the engine target speed is achieved by the engine feedback control in step S1, the engine target speed may be maintained by the output torque of the engine and the second motor may assist with the torque transmitted to the clutch during the clutch slipping to maintain the engine target speed. In addition, the method may further include maintaining the target speed of the engine by the torque assisted by the second motor and transmitting the engine torque to the clutch during the clutch slipping when the engine speed control is achieved by the second motor feedback control in step S1 (S2).

In step S5, as the second motor dischargeable limit torque, maximum dischargeable torque considering the system state of the battery including a temperature and a state of charge (SOC), a state of a motor system and consumed power of an electronic apparatus load may be determined IN the estimating of the transmission torque T_clutch in step S4, the transmission torque may be estimated as torque transmitted as friction surfaces on both ends of the engine clutch physically contact each other.

In step S6, the second motor assist torque T_hsg may be determined by selecting the smaller value between the clutch transmission torque T_clutch estimated in step S4 and the second motor dischargeable limit torque T_hsgDch calculated in step S5. In addition, the engine torque T_eng may be determined by subtracting the second motor assist torque T_hsg assisted by the second motor from a value acquired by adding the torque T_spdctrl for maintaining the engine target speed and the clutch transmission torque T_clutch for the clutch slipping.

In step S13, the second motor assist torque may be determined by adding torque

T_spdctrl for maintaining the engine target speed to the smaller value between the clutch transmission torque T_clutch and a value acquired by subtracting speed control margin torque from second motor dischargeable limit torque T_hsgDch, and the speed control margin torque may be torque which is substantially reduced by an error and consumption of motor energy when the engine is driven by the torque of the second motor. Additionally, in step S13, the engine torque may be determined by subtracting the second motor assist torque value from the clutch transmission torque. In response to receiving a request for stopping the slip control (steps S8 and S15), the control may be completed and when there is no request for stopping the slip control, the process may return to the previous step of applying the clutch pressure for the clutch slipping (steps S3 and S10).

According to the present invention, in both cases of an engine speed control by an engine torque feedback control through torque assist of a second motor and an engine speed control by a second motor torque feedback control scheme, engine torque Te may be significantly decreased by the torque assist by the second motor in an engine behavior when an engine clutch slip-starts or an engine behavior when engine clutch transmission torque is learned, and as a result, NVH may be reduced when an engine is operated.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Reference numerals set forth in the Drawings includes reference to the following elements as further discussed below:

10: engine
20: engine clutch
30: first motor
35: multi-clutch transmission
40: inverter
45: battery
50: second motor It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in more detail with reference to the accompanying drawings illustrating embodiments of the present invention.

Figure 4:
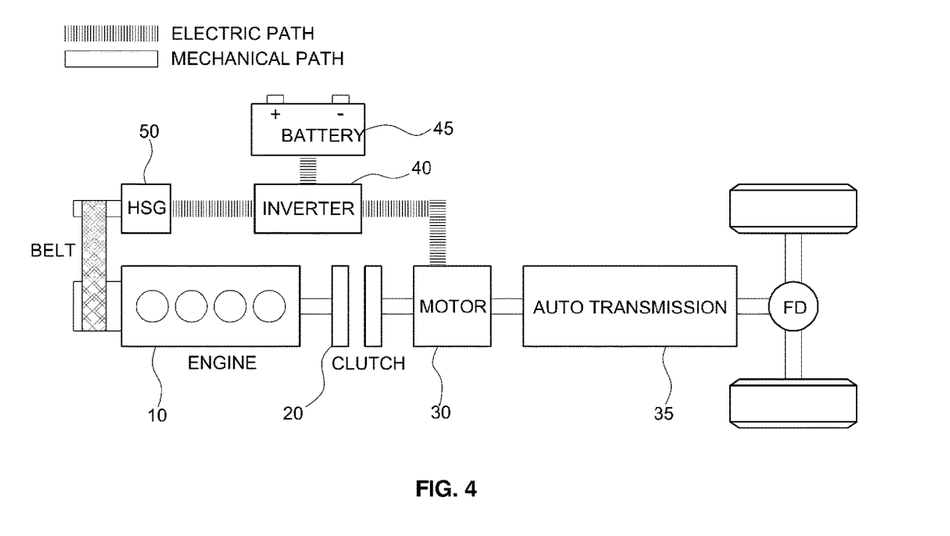
FIG. 4 is a schematic block diagram of a power train of a TMED HEV according to an exemplary embodiment of the present invention.

A TMED scheme power train structure of a hybrid electric vehicle (HEV) to which a driving force control method during engine clutch slipping of a transmission mounted electric device (TMED) HEV of the present invention is applied generally adopts a TMED scheme power train in which a motor and a transmission are connected as schematically illustrated in FIG. 4. In the TMED scheme power train structure of the hybrid electric vehicle, an engine 10 as a power source and a first motor (e.g., transmission side) 30 as a drive motor are provided and an engine clutch 20 may be interposed between the engine 10 and the first motor 30 and an output terminal of the first motor 30 may be connected to a clutch transmission or a multi-clutch transmission 35 including a DCT (Dual Clutch Transmission), and the like as schematically illustrated in FIG. 1.

In the hybrid electric vehicle, while the engine clutch 20 is connected or slips, the hybrid electric vehicle may be driven using the engine 10 and the first motor 30 (HEV driving) or driven by the engine (EG driving) and when the engine 10 is not used for driving and the HEV is driven by the first motor 30 (EV driving), the hybrid electric vehicle may be driven separate from the engine by opening the engine clutch 20. For example, a vehicle may be started using the first motor 30 which is high in efficiency at a low rpm during the initial start and low-speed driving and when the vehicle is driven at a predetermined speed, a second motor which is an integrated starter and generator (HSG) may be configured to start the engine 10 to use both an output of the engine and an output of an electric generator.

The outputs of the engine 10 and the first motor 30 may be shifted using the multi-clutch transmission 35 and thereafter, transferred to a drive shaft and finally transferred to a drive wheel. Vehicle driving force is acquired by the first motor 30 while the engine 10 is disconnected by opening the engine clutch 20 during the initial start and the low-speed driving as described above and since efficiency of the engine 10 is less than that of the first motor 30 at during the initial start of the vehicle, initiating the initial start using the first motor 30 which is high in efficiency is advantageous in terms of fuel efficiency of the vehicle.

In an HEV mode, the engine 10 may be connected to the first motor 30 by connecting the engine clutch 20, and as a result, rotational force of the engine 10 and rotational force of the first motor 30 may be transferred together to a drive shaft to drive the vehicle. Selection of drive modes of an EV mode and the HEV mode may be performed by executing an operation of the engine clutch and the operation of the engine clutch is generally executed by a hydraulic device.

In general, in addition to determination of a fuel injection time of the engine 10, motor torque instruction determination and engine clutch pressure determination with the second motor may be executed by a hybrid control unit (HCU), the first and second motors may be operated by a motor control unit (MCU), the first motor may be operated by 3-phase alternating current (AC) voltage applied from an inverter to generate torque and may be operated as a generator during coasting to supply regenerative energy to a battery.

Shift control of the multi-clutch transmission may be executed by a transmission control unit (TCU), the engine torque may be adjusted by an engine management system (EMS), and the EMS may be configured to execute start on/off and adjust an output of the engine. The second motor may be configured to operate as the starter and the generator and the second motor 50 and the first motor 30 may be operated based on a control signal applied by the inverter 40. The second motor 50 may be configured to execute the start on of the engine under control of the inverter and may operate as the generator while the engine maintains the start on to provide generated voltage to the battery 45 through the inverter 40 as charge voltage.

Figure 5:
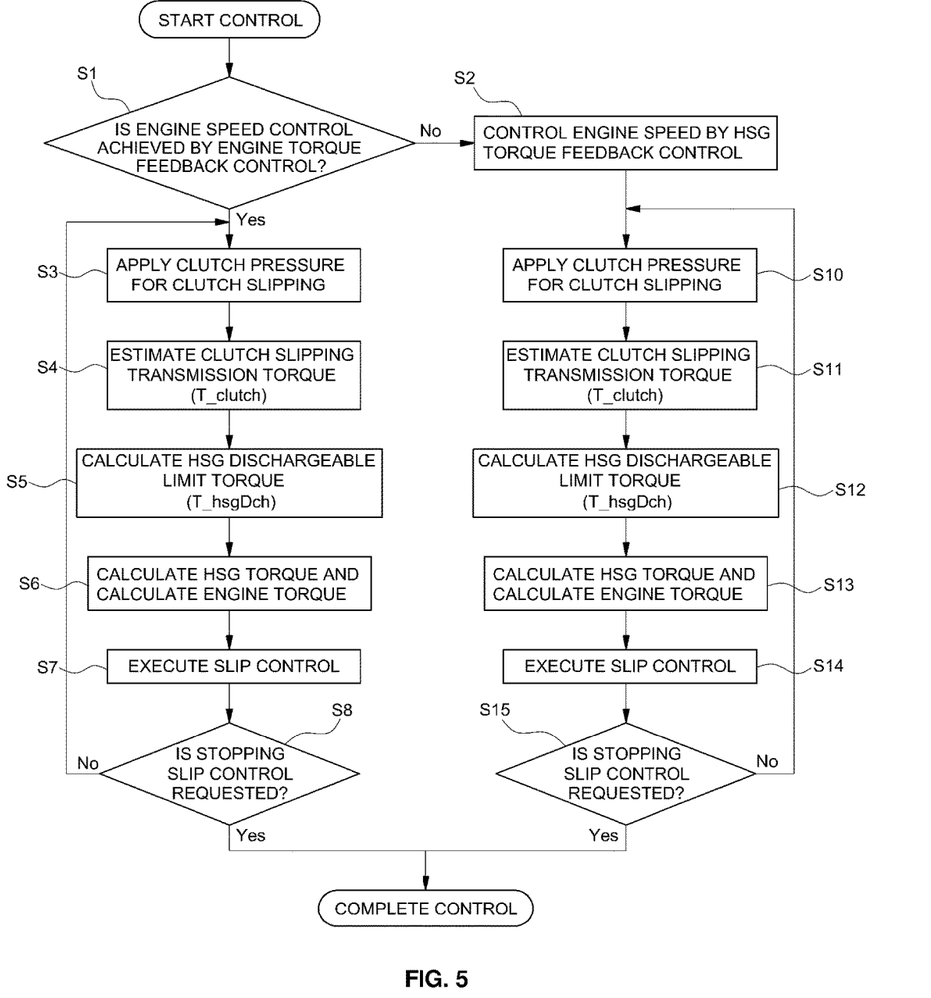
FIG. 5 is a flowchart of a driving force control method in case of clutch slipping by the present invention, which is applied to an engine of a TMED HEV according to an exemplary embodiment of the present invention.

Referring to FIG. 5, the driving force control method during the clutch slipping applied to the engine of the TMED HEV will be described. Slip control of the engine clutch may be performed when the battery maintains a low state of charge (LOW SOC), when the temperatures of the battery and the motor are greater than a predetermined reference temperature condition, and when the vehicle is requires to be started under a condition such a slope in which a gradient of a road in which the vehicle is driven is sharp (e.g., an inclined road), or the like Highly precise pressure control may be required to slip-control the engine clutch under the operating conditions.

In general, the engine may be operated in a low rpm zone, that is, an idle rpm zone during the vehicle start through the engine clutch slipping and the clutch slipping for learning the engine clutch transmission torque. As a result, the engine may be operated to maintain a predetermined target speed, for example, an idle speed of about 1200 to 1300 rpm while the transmission is coupled to a parking state ("P stage") or a neutral state ("N stage"). In particular, the adjustment of the speed may be performed differentially based on a main agent of engine speed control, that is, whether the engine speed is adjusted by an engine feedback control or based on a feedback control by the second motor and the adjustments are separately described below.

Engine Speed Control by Engine Torque Feedback Control

First, a controller may be configured to determine whether a target speed of the engine, that is, a speed during idling is adjusted by the engine feedback control (step S1) and when the speed control during the engine idling is adjusted by the feedback control of the engine, an engine idling speed may be maintained by the engine torque. Clutch pressure for the clutch slipping may be applied with hydraulic pressure by the hybrid control unit (e.g., the controller) (step S3). Similar to the engine clutch slipping for starting the vehicle and the engine clutch slipping for learning the engine clutch transmission torque, when the clutch pressure is applied in step S3, the torque of the engine clutch equivalent to the pressure applied to the engine clutch may operate as a load in an engine system during the engine clutch slipping.

Particularly, the clutch slipping transmission torque T_clutch may be estimated as below (S4). The torque transmitted to the engine clutch as torque transmitted as friction surfaces on both ends of the engine clutch physically contact each other may be primarily estimated through effective pressure and a friction coefficient and the transmission torque is generally expressed by an equation given below.

$$T\_clutch = \mu A \cdot n \cdot P \cdot \Delta rpm$$

wherein T_clutch represents torque transmitted to the clutch, t represents the friction coefficient, A represents a pressure application area, n represents the number of friction surfaces, P represents the applied pressure, and Δrpm represents a difference in rpm between both ends of the engine clutch.

The clutch transmission torque estimation value T_clutch may be used to determine assist torque amount of the second motor to be described below. In step S5, second motor dischargeable limit torque T_hsgDch may be calculated. The dischargeable limit torque of the second motor may be determined as maximum dischargeable torque considering the system state of the battery (e.g., temperature, SOC, or the like), and a state of a motor system and consumed power of an electronic apparatus load. Then, the second motor assist torque and the engine torque may be calculated (step S6). In the engine feedback control in step S1, the engine target speed may be maintained by the output torque of the engine and the second motor assists the torque transmitted to the clutch during the clutch slipping to maintain the engine target speed.

As a result, since the second motor assist torque T_hsg needs to satisfy dischargeable limit conditions together with the clutch slipping, the second motor assist torque T_hsg may be determined by selecting the smaller value between the clutch transmission torque T_clutch estimated in step S4 and the dischargeable limit torque T_hsgDch of the second motor calculated in step S5.

$$T\_hsg = \min(T\_clutch, T\_hsgDch)$$

Further, the engine torque T_eng may be determined by subtracting the assist torque T_hsg assisted by the second motor from a value acquired by adding the torque T_spdctrl for maintaining the engine target speed, that is, the idle speed and the clutch transmission torque T_clutch for the clutch slipping.

$$T\_eng = T\_spdctrl + T\_clutch - T\_hsg$$

Then, the clutch slipping control may be performed (step S7) and in response to detecting a request for stopping the clutch slipping control (step S8), the clutch slipping control may terminate and when there is no request for stopping the clutch slipping control, the process may return to the previous step of step S3 to repeatedly perform steps S3 to S8.

Engine Speed Control by Second Motor Torque Feedback Control

When the engine speed adjustment (e.g., control) is not the engine feedback control in step S1, a controller may be configured to determine that the engine speed control is achieved by the feedback control of the second motor to perform the adjustment (step S2). The feedback control of the second motor in step S2 is different from the engine feedback control in that the target speed of the engine, that is, the engine idle may be maintained by output torque assisted by the second motor and the torque transmitted to the clutch during the clutch slipping is by the engine torque.

In step S10, the clutch pressure may be applied by the hydraulic pressure for the clutch slipping, in step S11, the transmission torque for the clutch slipping may be estimated, in step S12, the second motor dischargeable limit torque may be calculated, and steps S10, S11, and S12 are similar to steps S3, S4, and S5 described above. However, when the engine speed control is achieved by the second motor torque feedback control, performing calculation of the second motor torque and calculation of the engine torque (S13) is substantially different from performing the calculation of the second motor torque and the calculation of the engine torque in the engine speed control by the engine torque feedback control (S6). Steps S2 and S10 to S13 are different from steps S1 and S3 to S7 of adjusting the engine speed by the engine torque feedback control in that the engine may be driven by the second motor and the engine speed adjustment may be executed by the second motor.

In the determination of the second motor assist torque, a speed control margin may be considered for maintaining the engine target speed by the second motor. In other words, a target idle speed of the engine driven by transmitting the torque of the second motor is different from an actual rotational speed at an output shaft of the second motor and for example, when the engine target idle speed may be about 1200 rpm, when the engine is driven by the second motor, the actual engine idle speed which is about 1000 rpm is different from the engine target idle speed due to an error and consumption of motor energy and substantial second motor dischargeable limit torque may be determined by subtracting the speed control margin torque from the second motor dischargeable limit torque, and as a result, the engine torque may be determined as engine torque which increases by the speed control margin torque.

Accordingly, the second motor assist torque may be determined by adding torque T_spdctrl for maintaining the engine target speed to the smaller value between the clutch transmission torque T_clutch and a value acquired by subtracting the speed control margin torque from the second motor dischargeable limit torque T_hsgDch, and as a result, the determination of the second motor assist torque in step S13 may be expressed as below.

$$T\_hsg = \min(T\_clutch, T\_hsgDch - \text{speed control margin torque}) + T\_spdctrl$$

In particular, the engine torque is expressed as below by subtracting the second motor assist torque value from the clutch transmission torque.

$$T\_eng = T\_clutch - \min(T\_clutch, T\_hsgDch - \text{speed control margin torque})$$

Then, in step S14, the clutch slipping control may be executed, in step S15, in response to detecting the request for stopping the clutch slipping control, the clutch slipping control may terminate, and when there is no request for stopping the clutch slipping control, the process may return to the previous step of step S10 described above to repeatedly perform steps S10 to S15.

Further, data regarding the torque T_spdctrl for maintaining the idle speed, the estimated clutch transmission torque T_clutch, the second motor dischargeable limit torque T_hsgDch, and the second motor assist torque T_hsg may be stored in a separate controller (e.g., a memory of a controller) to be learned when the engine clutch transmission torque is learned or the engine clutch slipping is started in various engine idle speeds.

Figure 6:
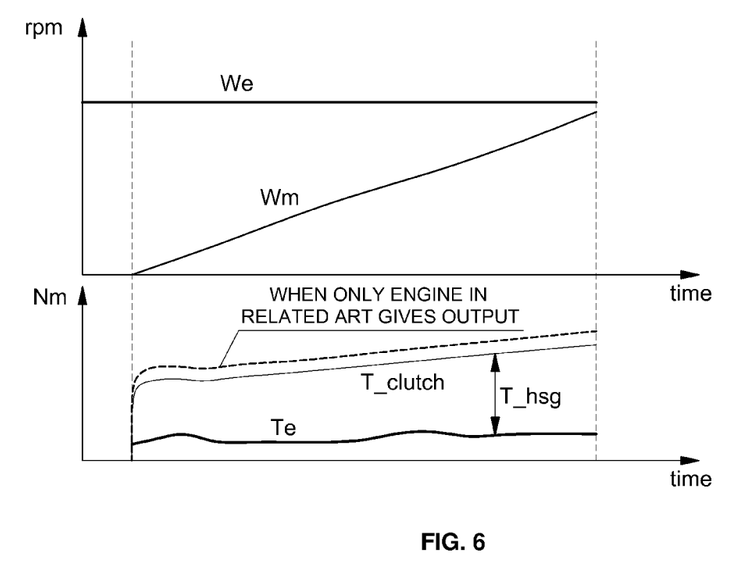
FIGS. 6 and 7 are graphs illustrating a behavior characteristic when an engine clutch slip-starts in the TMED HEV according to an exemplary embodiment of the present invention and a behavior at the time of controlling engine clutch transmission torque feedback.
Figure 7:
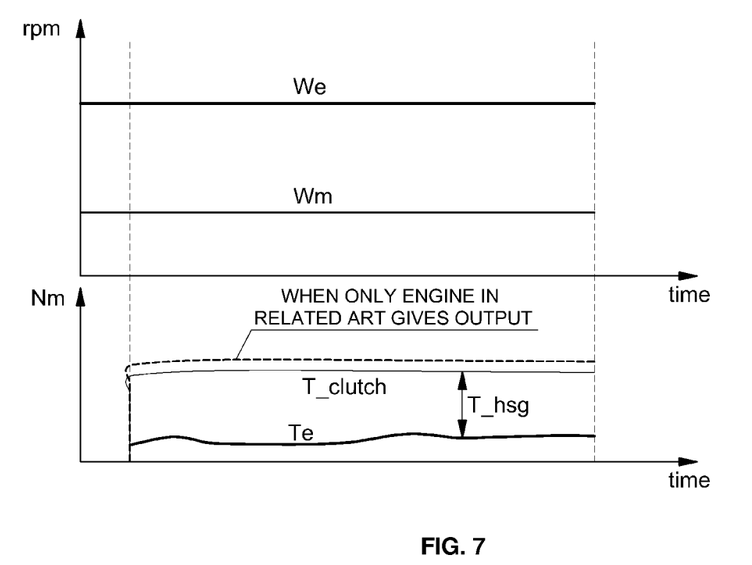
Figure 8:
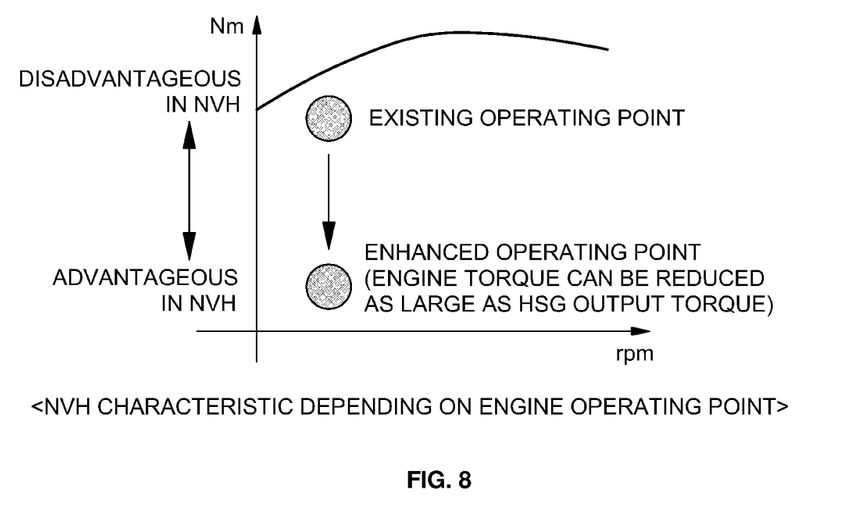
FIG. 8 is a graph illustrating an NVH characteristic based on reduction of engine torque as large as second motor output torque and an engine operating point in the TMED HEV according to an exemplary embodiment of the present invention.

FIGS. 5 and 6, according to the present invention, show that in both behaviors during the engine clutch slipping start and learning the engine clutch transmission torque, the engine torque Te may be significantly decreased by the torque assist by the second motor as compared with the graph of FIG. 1 in the related art, and as a result, the engine may be operated in the zone where the NVH is minimally generated as illustrated in FIG. 8.

According to the control method of the present invention, for the engine speed control by the engine speed control scheme by the engine torque feedback control through the torque assist of the second motor or by the second motor torque feedback control scheme, the engine toque may be reduced as much through the second motor torque assist, and as a result, the engine may be operated while the NVH is minimally generated. The present invention may be applied to the TMED HEV to be used for improving the NVH when the engine is operated at the low speed.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A driving force control method during engine clutch slipping of a transmission mounted electric device (TMED) for a hybrid electric vehicle (HEV) including an engine and a second motor which is a hybrid starter generator (HSG), a first motor disposed at a transmission side, an engine clutch interposed between the engine and the first motor, and a multi-clutch transmission connected with an output terminal of the first motor, the method comprising:
    verifying, by a controller, whether a control for maintaining a target speed of the engine is achieved by an engine feedback control or by a second motor torque feedback control;
    applying, by the controller, clutch pressure for the clutch slipping with hydraulic pressure;
    estimating, by the controller, when the clutch pressure is applied clutch slipping transmission torque T_clutch in which torque of the engine clutch equivalent to the pressure acts as a load;
    calculating, by the controller, second motor dischargeable limit torque;
    calculating, by the controller, second motor assist torque and engine torque; and
    executing, by the controller, a slip control,
    wherein in calculating the second motor assist torque and the engine torque, when the control for maintaining the target speed of the engine is achieved by the engine feedback control, torque for maintaining the engine target speed is considered for calculating the engine torque and when the control for maintaining the target speed of the engine is achieved by the second motor torque feedback control, the torque for maintaining the engine target speed is considered for calculating the second motor assist torque.

2. The method of claim 1, wherein when the engine target speed control is achieved by the engine feedback control, the engine target speed is maintained by the output torque of the engine and the second motor assists with the torque transmitted to the clutch during the clutch slipping to maintain the engine target speed.

3. The method of claim 1, further comprising:
    maintaining, by the controller, the target speed of the engine by the torque assisted by the second motor; and
    transmitting, by the controller, the engine torque to the clutch during the clutch slipping when the engine speed control is achieved by the second motor feedback control.

4. The method of claim 2, wherein as the second motor dischargeable limit torque, maximum dischargeable torque considering the system state of the battery including a temperature and a state of charge (SOC), and a state of a motor system and consumed power of an electronic apparatus load is determined.

5. The method of claim 2, wherein in the estimating of the transmission torque, the transmission torque is estimated as torque transmitted as friction surfaces on both ends of the engine clutch physically contact each other.

6. The method of claim 2, wherein the second motor assist torque is determined by selecting the smaller value between the estimated clutch transmission torque and the calculated second motor dischargeable limit torque.

7. The method of claim 6, wherein the engine torque is determined by subtracting the assisted second motor assist torque from a value acquired by adding the torque for maintaining the engine target speed and the clutch transmission torque for the clutch slipping.

8. The method of claim 3, wherein the second motor assist torque is determined by adding torque for maintaining the engine target speed to the smaller value between the clutch transmission torque and a value acquired by subtracting speed control margin torque from second motor dischargeable limit torque \, and the speed control margin torque is torque reduced by an error and consumption of motor energy when the engine is driven by the second motor torque.

9. The method of claim 8, wherein the engine torque is determined by subtracting the second motor assist torque value from the clutch transmission torque.

10. The method of claim 1, wherein in response to detecting a request for stopping the slip control, the control is completed and when there is no request for stopping the slip control, the clutch pressure is applied for the clutch slipping.

* * * * *